Oct. 2, 1945.    H. F. TAYLOR ET AL    2,386,076
APPARATUS FOR REMOVING INDIVIDUAL UNITS
Filed Nov. 25, 1944    5 Sheets-Sheet 1

INVENTORS
HARDEN F. TAYLOR AND
VLADIMIR A. NEDZVEDSKY
BY Wm. S. Pritchard
ATTORNEY.

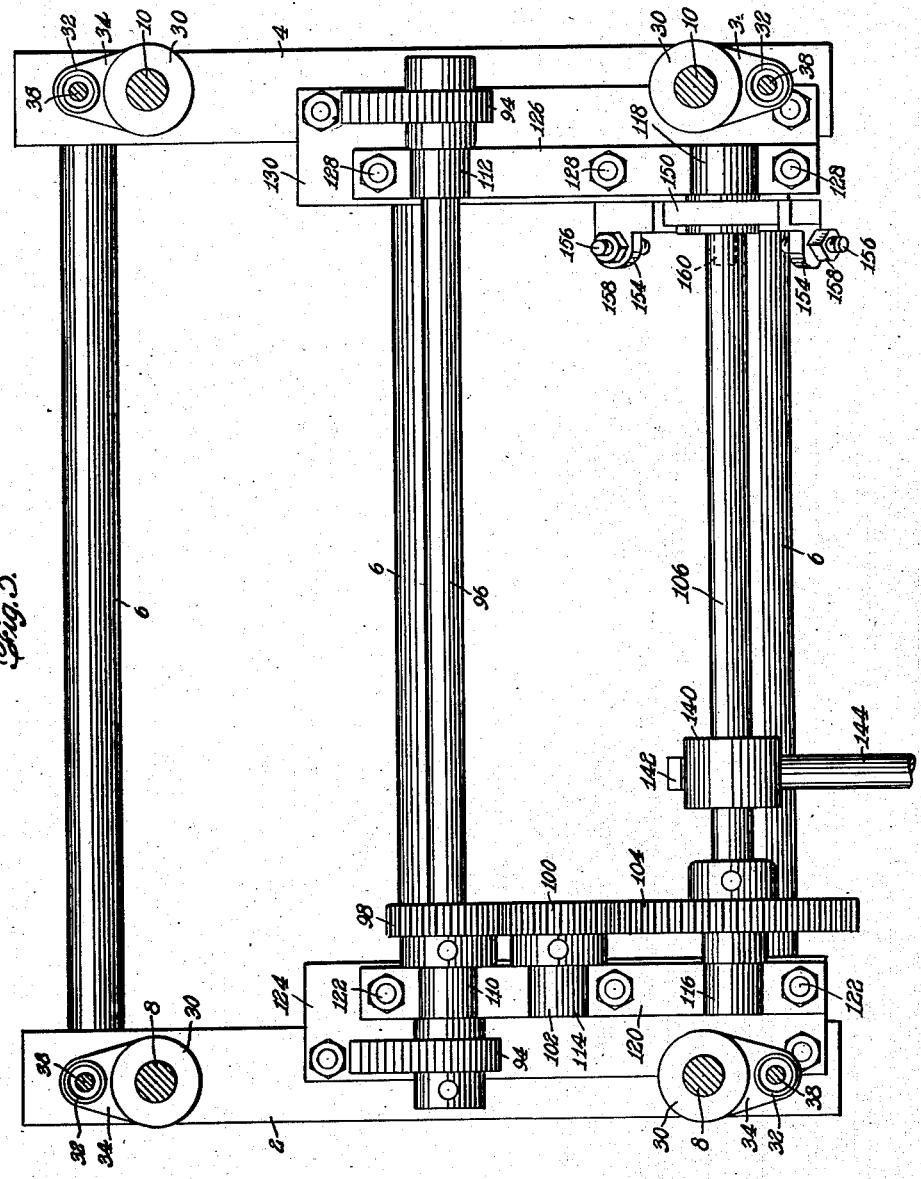

Oct. 2, 1945.   H. F. TAYLOR ET AL   2,386,076
APPARATUS FOR REMOVING INDIVIDUAL UNITS
Filed Nov. 25, 1944   5 Sheets-Sheet 4
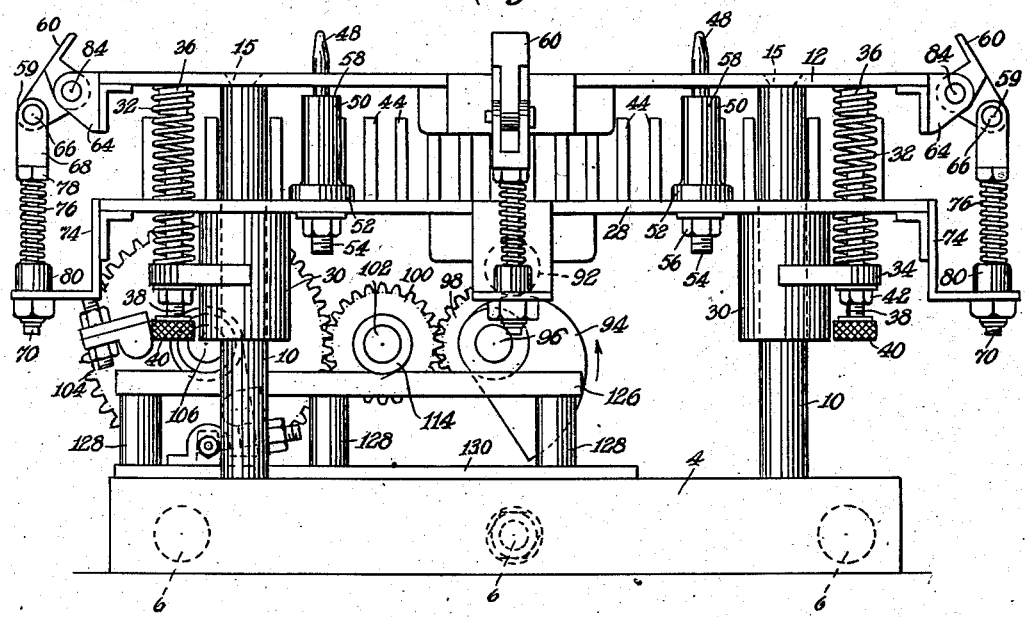
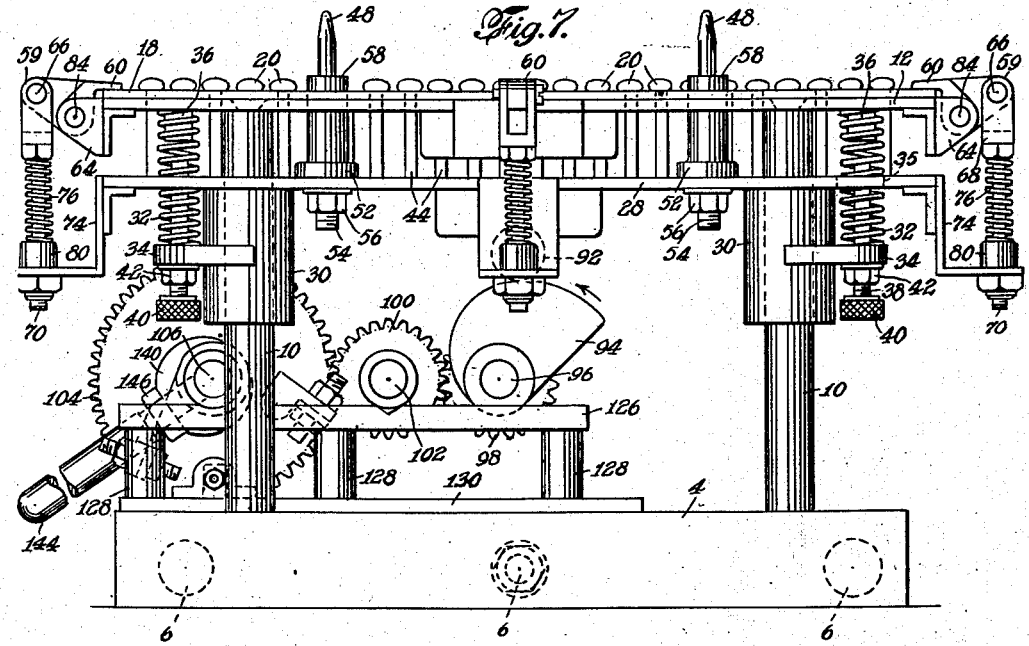
INVENTORS
HARDEN F. TAYLOR AND
BY VLADIMIR A. NEDZVEDSKY
ATTORNEY.

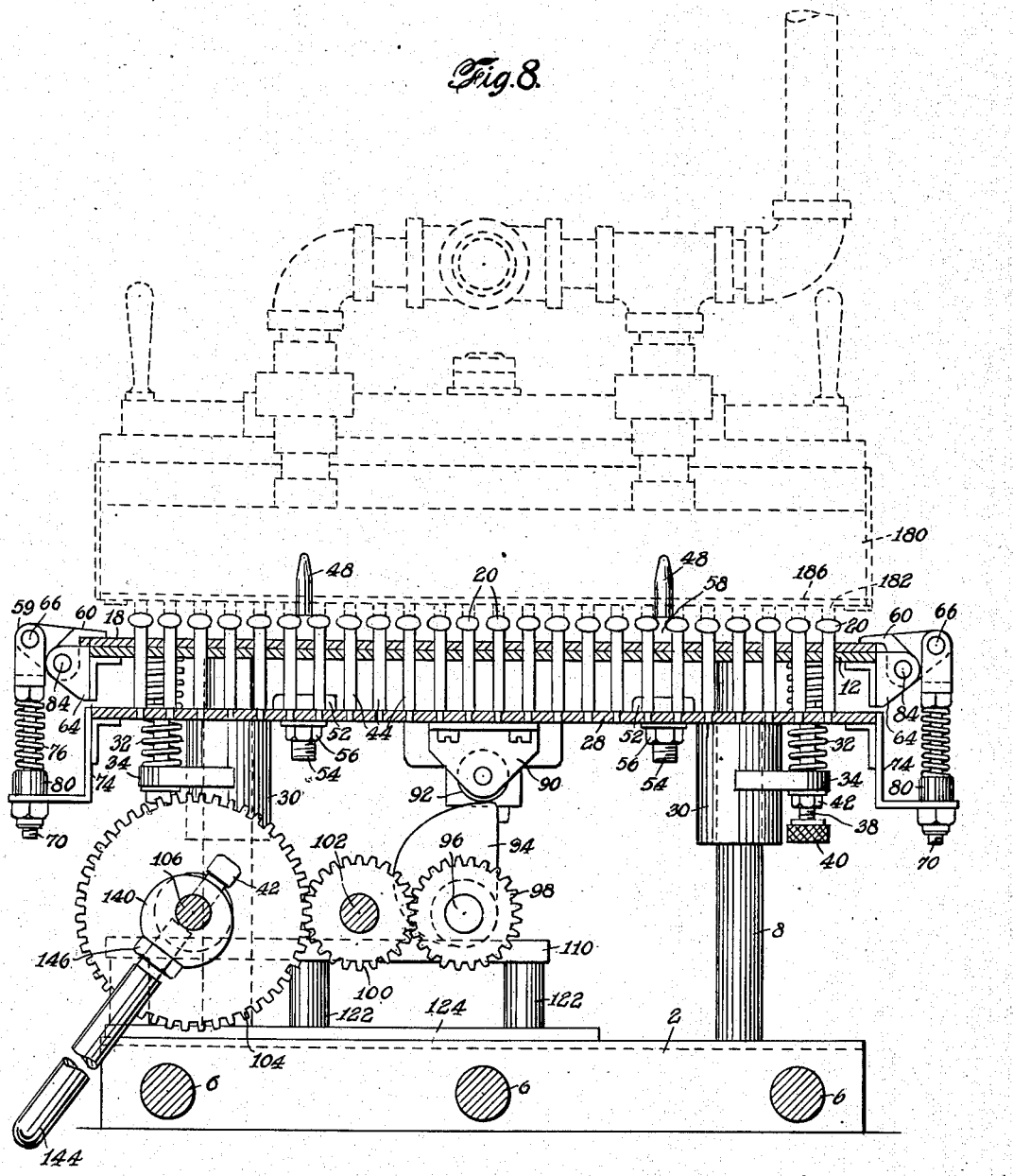

Patented Oct. 2, 1945

2,386,076

UNITED STATES PATENT OFFICE 2,386,076

APPARATUS FOR REMOVING INDIVIDUAL UNITS

Harden F. Taylor and Vladimir A. Nedzvedsky, New York, N. Y., assignors to The Atlantic Coast Fisheries Company, New York, N. Y., a corporation of Maine Application November 25, 1944, Serial No. 565,140

9 Claims. (Cl. 214—1)

This invention relates to an apparatus for simultaneously removing a plurality of individual units from a transfer plate on which each of the units is individually supported on a circumference of a perforation and the perforations are arranged in accordance with a predetermined geometric pattern.

Though the invention is capable of use with various small unit objects, such as pills, tablets, confections and the like, the invention will, for the sake of brevity and convenience, be described in connection with individual molded unit portions or doses of vitamin preparations which consist of discrete particles of a vitamin-bearing oil containing vitamin A dispersed in a matrix comprising a gelable colloid, such as gelatin, said matrix preferably also containing a plasticizer, and which individual molded units have been produced in starch molds. Such unit portions are prepared by depositing a predetermined quantity of the selected gelatin emulsion containing the vitamin dispersed therein in individual depressions formed in the mold. The composition is permitted to remain in each depression until it has set to form a firm gel. The mold depressions are preferably arranged in a regular, uniform geometric pattern, such as straight rows, transverse and longitudinal. When such individual molded units are to be coated, for example with gelatin, the individual molded units, while still in the mold in which they were formed, are individually and simultaneously seized at the tops thereof by a suction pick-up device provided with a plurality of short tubular holders arranged in precisely the same geometric pattern as that of the molded units in the mold, so that when the mold and suction device are brought into properly aligned position with each other, each tubular holder will be disposed directly above an individual molded unit. When the tubular holders are brought in contact with the molded units and vacuum is applied, each tubular holder will firmly seize and grip a unit at an area of its surface above its equator. Upon upward movement of the pick-up device, the units are removed from the mold. Prior to seizing the individual units by the suction pick-up device, there is disposed on the suction device a transfer plate which has a plurality of holes arranged in a geometric pattern corresponding precisely to the position of the tubular holders on the suction device. The perforated plate is of a thickness materially less than the length of the tubular holders of the pick-up device, and the holes thereof are of a diameter which permits a sliding movement on the tubular holders cooperating therewith.

After the individual molded units have been seized by the pick-up device, as above described, they are immersed in a gelatin solution maintained at an elevated temperature to a depth slightly above the equatorial axes of the molded units. Upon removal from the coating bath, the pick-up device is inverted. After the coating has gelled and the vacuum is released, the transfer plate is elevated, with the consequence that each individual unit, now semi-coated, is removed from the respective tubular holder and supported by the periphery of a perforation of the plate. The semi-coated units are removed from the transfer plate by a vacuum pick-up device provided with a transfer plate, as previously described. The units, while so held, are immersed into the gelatin bath whereby the previously uncoated portion is coated. After the coating has gelled, the units are removed from the suction device by the transfer plate, as previously described.

Considerable difficulty has been encountered in the removal of the semi-coated individual units from the transfer plate after the coating operations, and particularly after the first coating operation. Frequently, some of the molded units adhere tenaciously to the transfer plate and are damaged upon removal by the suction device.

An object of this invention is to provide a new and improved mechanism for simultaneously removing the molded units carried on a transfer plate and present them in position whereby the molded units can be simultaneously seized.

Another object of this invention is to provide an apparatus wherein, after the transfer plate carrying the molded units is positioned therein and the apparatus actuated, the transfer plate will be securely clamped in position prior to the removal of the individual units from said plate.

Other and additional objects will appear from the description hereinafter.

The above objects are accomplished, in general, by providing an apparatus having a stationary support upon which the perforated transfer plate supporting an individual unit in each perforation is positioned. The stationary support is perforated and the holes thereof are in alignment with the holes of the transfer plate positioned thereon. A movable plate having pins in alignment with the holes of the stationary support is disposed beneath the stationary support. A plurality of clamping members are positioned along the edges of the stationary plate, and the means for actuating said clamps is carried by the movable plate. The movable plate is provided with means whereby upon actuation thereof the movable plate will be elevated. Upon elevation, the clamps will firmly clamp the transfer plate to the support and, upon continued elevation, the pins carried by the movable plate will elevate the molded units in alignment therewith and remove them from the transfer plate. The movable plate is provided with means to position and elevate the vacuum head which is positioned on the apparatus after the transfer plate has been secured, the elevation of the vacuum head being effected simultaneously with the removal of the units from the transfer plate in order to prevent compression of the units. The stationary plate is provided with means to properly position the transfer plate.

The specific details of construction of the apparatus will now be described in connection with the accompanying drawings forming a part of this specification and in which:

Figure 2 is a front elevation of the apparatus shown in Figure 1;

Figure 3 is a section taken on the line 3—3 of Figure 2;

Figure 4 is a section taken on the line 4—4 of Figure 2;

Figure 5 is a section taken on the line 5—5 of Figure 4;

Figure 6 is an end elevation looking to the right in Figure 1 and showing the apparatus ready to receive the transfer plate;

Figure 7 is a view similar to Figure 6 and showing the apparatus with the transfer plate clamped in position; and Figure 8 is a central cross-section showing the apparatus with individual molded units removed from the transfer plate and in position to be picked up by a suction pick-up device.

Figure 1:
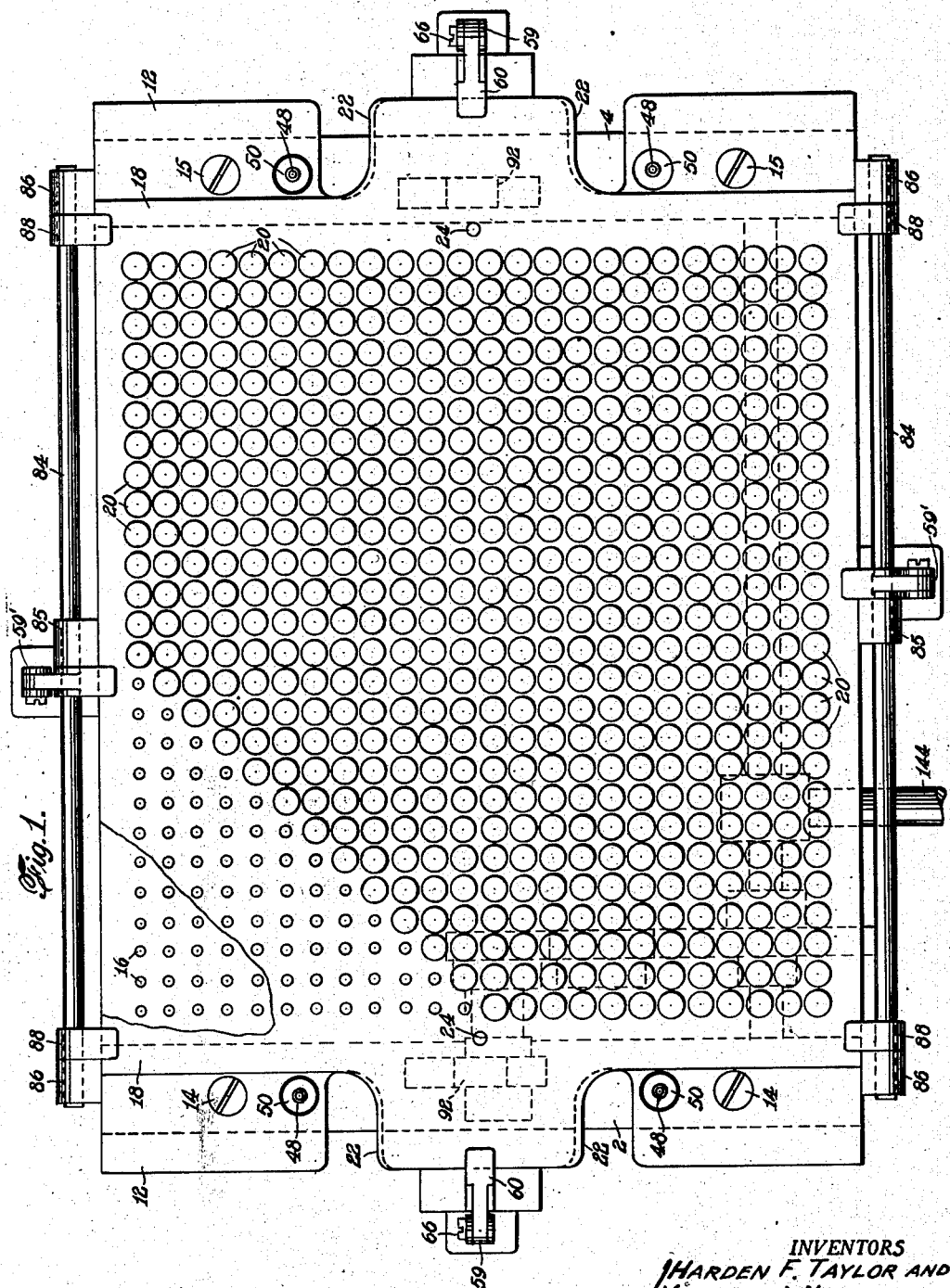
Figure 1 is a top plan view of an illustrative embodiment of the apparatus.

Referring now to the drawings wherein like reference numerals designate like parts, the reference numerals 2 and 4 designate a pair of channels secured together by tie-bolts 6 to form a base on which the apparatus is mounted. The base may be disposed on any suitable support, such as, for example, on the top of a table. A pair of spaced posts 8 are secured at the bottom thereof to the channel 2, and a similar pair of posts 10 are secured at the bottom thereof to the channel 4. A stationary plate 12 is disposed on the posts 8 and 10 and is secured in position thereon in any suitable manner, such as by flat screws 14 and 15. The stationary plate 12 is provided with a plurality of holes 16 arranged in the precise geometric pattern as the holes of a transfer plate 18 and, as shown in Figure 7, an individual unit 20 is carried by each hole of the transfer plate. The stationary plate 12 is provided with a pair of finger slots 22 in each end thereof for reasons which will become apparent hereafter.

As shown in Figure 1, the stationary plate 12 is provided with a pair of oppositely disposed positioning pins 24 which are adapted to be received in holes correspondingly disposed in the transfer plate 18 whereby the transfer plate is properly positioned on the stationary plate. The transfer plate 18 is also provided with a pair of finger slots in each end thereof whereby the operator may more expeditiously position the transfer plate on the stationary plate 12.

Disposed beneath and in spaced relation to the stationary plate 12 is a movable plate 28 which is provided with holes through which the posts 8 and 10 extend and whereby the plate 28 is slidably mounted on the posts 8 and 10. For reasons which will become apparent hereinafter, means are provided to urge the movable plate 28 downwardly. With this in view, on each of the posts 8 and 10 there is slidably disposed a sleeve 30 which is appropriately secured to the bottom of the plate 28. Since the details of construction of the elements appurtenant to each sleeve 30 are identical, the elements cooperating with one of the sleeves 30 will now be described.

A spring 32 passing through a hole in the plate 28 is positioned between the bottom of the stationary plate 12 and an ear 34 formed integral with the sleeve 30. A lug 36 carried on the bottom of the stationary plate 12 and a screw 38 threadedly secured in the ear 34 serve to maintain the spring 32 in position. The tension of the spring 32 may be adjusted by rotation of the knurled head 40 of the screw 38 in proper position. A lock nut 42 secures the screw 38 in adjusted position.

The movable plate 28 is provided with a plurality of ejector pins 44 which are arranged thereon in the same geometric pattern as the perforations in the stationary plate 12. The exposed tips of each pin may, if desired, be shaped to conform with the molded units with which they are to cooperate. The diameter of each pin 44 is smaller than the diameter of the perforations in both the stationary plate 12 and the transfer plate 18 which is to be disposed thereon.

The movable plate 28 also carries locating pins 48, preferably disposed as shown in Figure 1. Each locating pin 48 extends from the top of a body member 50. At the other end, the body member 50 is provided with a base 52 which is seated on the top of the plate 28. A threaded stem 54 extends through a hole in the plate 28 and a lock nut 56 on the stem 54 secures it in position. The top 58 of the body member 50 constitutes a shoulder, and both the stationary plate 12 and the transfer plate 18 are provided with aligned holes permitting such body members 50 to be slidably movable therein and therethrough.

Referring now to Figure 1, it will be noted that at each side and preferably at the center thereof there is provided a clamping mechanism, generally designated by the reference numeral 59. As shown in Figures 6, 7 and 8, each clamping mechanism 59 has a clamping member 60 secured to a pin 62 rotatably mounted in a bracket 64 secured to the stationary plate 12. The clamping member 60 is secured to a pin 66 carried in a yoke 68 which is threadedly secured on one end of a screw 70 which is slidably mounted in an arm of a bracket 74 secured to the movable plate 28. A spring 76 positioned around the screw 70 has one end thereof in engagement with a nut 78 threaded on the screw 70 adjacent the yoke 68, and the other end in engagement with a member 80 slidably mounted on the screw 70. The screw 70 is adjustably mounted with respect to the bracket 74, and a nut 82 secures the screw in adjusted position.

As shown in Figure 1, a clamping mechanism 59' is also positioned adjacent the front and rear edges of the stationary plate 12. The details of construction of the clamping elements 59' and the manner in which each is mounted are identical to the clamping elements 59 except that instead of the pivot pin 62 as provided in the clamping mechanism 59, each clamping element 59' is provided with a pivot shaft 84 which extends longitudinally of the machine and is supported in an intermediate bearing 85 and end bearings 86. Adjacent each end bearing 86, a clamping member 88 is secured in any appropriate manner to the shaft.

At each side and intermediate its ends, the movable plate 28 is provided with a downwardly extending bracket 90 in which a cam follower 92 is positioned. Due to the action of the springs 32, the plate 28 is urged downwardly and the cam followers 92 rest on cams 94 mounted on a cam shaft 96. The cam shaft 96 is provided with a gear 98 which is driven by an idler gear 100 on a stub shaft 102. The gear 100 is driven by a gear 104 mounted on a shaft 106, which is actuated as will be hereafter described.

The shaft 96 is mounted in a pair of pillar blocks 110 and 112. The stub shaft 102 is mounted in a pillar block 114. The shaft 106 is mounted in a pair of pillar blocks 116 and 118. The pillar blocks 110, 114 and 116 are carried on a shelf 120 supported on posts 122 mounted on a platform 124 appropriately mounted on the channel 2. The pillar blocks 112 and 118 are carried on a shelf 126 supported on posts 128 mounted on a platform 130 appropriately mounted on the channel 4.

A block 140 is secured to the shaft 106 by means of a set screw 142. A handle 144 is threadedly secured to the block 140 and a lock nut 146 secures the handle in adjusted position.

As is apparent from the foregoing description, upon movement of the handle 144 in the desired direction, rotation will be imparted to the actuating shaft 106 which will be transmitted through the gears 104, 100 and 98 to the cam shaft 96. Means are provided to limit the extent of rotation of the shaft 106. In the form shown (see Figures 2, 4 and 5), a segment 150 is secured to the shaft 106 by a set screw 152. On each side, the segment 150 has secured thereto an ear 154 in which there is adjustably disposed a stop pin 156. A pair of lock nuts 158 secure the stop pins in adjusted position. An upstanding lug 160 is carried on an arm 162 secured to the platform 130. The lug 160 is so positioned that upon rotation of the shaft 106 either one of the stop pins 156 will engage said lug and limit further movement in that direction.

For reasons which will become apparent, the segment 150 is provided with a depression 164, into which the ball end 165 of a spring-pressed plunger 166 is adapted to be received when the depression 164 is brought into alignment with said plunger 166. The plunger 166 is carried in a housing 168 secured to the platform 130, and a spring 169 within the housing 168 urges the plunger forwardly. The plunger 166 is adjustably secured in the housing 168, and lock nuts 170 secure the plunger in adjusted position. It is thus apparent that when the depression 164 comes in alignment with the plunger 166, the latter will enter the same and serve to maintain the shaft 106 against rotation. The depression 164 and the ball end 165 of the plunger, however, are so shaped that application of pressure on the handle 144 will cause the plunger 166 to ride out of the depression, thereby releasing the locking effect.

In operation, the apparatus is adjusted to the position shown in Figure 6. As will be seen from reference to Figure 6, the screw 156 is in engagement with the stop 160 whereby movement of the shaft in one direction is prevented, and the springs 32 urge the movable plate 28 downwardly so that the cam followers 92 carried thereby rest on the cams 94 which are in their lower position.

Due to the position of the movable plate 28, the clamping elements 60 and 88 are in open position, the top of the ejector pins 44 are spaced from the stationary plate 12, and the shoulders 58 of the locating pins 48 are spaced from the stationary plate 12. After adjustment, the perforated transfer plate 18 carrying the individual units 20 is disposed on the stationary plate 12 so that the positioning pins 24 on the stationary plate 12 enter correspondingly located holes in the transfer plate 18, whereby the transfer plate 18 is properly positioned on the stationary plate 12.

The operator then actuates the handle 144 to rotate the actuating shaft 106 in the direction of the arrow shown in Figure 6. The rotation of the shaft 106 is transmitted to the cam shaft 96. The actuation of the handle 144 is continued until the recess 164 on the segment 150 is brought into alignment with the plunger 166, whereby the segment 150 and hence the shaft 106 are locked into position. During the aforementioned actuation, the cams 94 rotate in the direction of the arrow shown in Figure 6 until the cams 94 assume the position shown in Figure 7. During this operation, the movable plate 28 is elevated because of the contour of the cams 94. As the movable plate is elevated, the brackets 74 carried thereby are also elevated. The elevation of the brackets 74 elevates the screws 70 of the clamping mechanisms 59 and 59'. The elevation of the screws 70 causes the clamping elements 60 to move downwardly and clamp the transfer plate 18 to the stationary plate 12. At the same time, the shafts 84 of the clamping elements 59' are rotated and the clamping elements 88 are also brought into engagement with the transfer plate 18 adjacent the corners thereof. The elevation of the movable plate 28 also causes the elevation of the dowel pins 48, and the enlargements 50 thereof pass through aligned holes in the stationary plate 12 and the transfer plate 18, as shown in Figure 7.

When the parts have assumed the position shown in Figure 7, a vacuum head 180 having tubular holders 182, arranged to correspond with the arrangement of the units 20, is brought into position and disposed so that the tubular holders 182 are in engagement with the individual units 20. The vacuum head 180 is provided with holes into which the locating pins 48 enter, and the shoulders 58 of the locating pins cooperate with shoulders in the vacuum head 180 to support the vacuum head in position. It is to be noted that a transfer plate 186 is also carried by the vacuum head.

The operator then manipulates the handle 144 to continue the rotation of the cams 94 in the direction shown in Figures 6 and 7 until the stop 160 is engaged by the stop pin 156. It is to be noted that due to the construction of the depression 164 and the ball end 165 of the plunger 166, release therebetween is effected upon the further manipulation of the handle 144. At this time, the cam followers 92 are on the high points of the respective cams 94 and the movable plate 28 has been further elevated. The further elevation of the movable plate 28 causes the ejector pins 44 to pass through the aligned holes in the stationary plate 12 and the transfer plate 18 and elevate the individual units from the transfer plate. The elevation of the movable plate 28 also causes elevation of the locating pins 48 whereby the vacuum head 180 is also simultaneously elevated the same distance without releasing contact with the individual units. Further, during this elevation, since the screws 70 of the clamping elements 59 and 59′ can no longer be elevated, the elevation of the bracket 74 will elevate the members 80 slidably mounted on the screws 70 against the action of the springs 76. In this position, which is shown in Figure 8, a valve in the line connecting the vacuum head to a source of vacuum is opened and each tubular holder 182 firmly seizes the individual unit 20 disposed therebeneath and carried by an ejector pin 44. After the units 20 have been gripped, the vacuum head is raised whereby the units are removed from the apparatus.

The units held on the vacuum head may be treated as further desired, as by immersion in a coating tank and, after inverting the vacuum head, such units may be removed from the vacuum head by removal of the transfer plate 186. The operator then actuates the handle 144 in the opposite direction whereby the parts are brought back to the original position, and another transfer plate carrying the units is disposed on the stationary plate and the operation repeated.

Since it is obvious that various changes and modifications may be made in the above description without departing from the nature or spirit thereof, this invention is not restricted thereto except as set forth in the appended claims.

We claim:

1. An apparatus for removing unit objects carried in perforations of a transfer plate comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, a plurality of clamps positioned adjacent the edges of said stationary plate, means controlled by the upward movement of said movable plate to actuate said clamps to secure the transfer plate to said stationary plate, and means to move said movable plate in an upward direction whereby the clamps secure the transfer plate to the stationary plate and the ejector pins elevate the units from the transfer plate.

2. An apparatus for removing unit objects carried in perforations of a transfer plate comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, a plurality of clamps positioned adjacent the edges of said stationary plate, means controlled by the upward movement of said movable plate to actuate said clamps to secure the transfer plate to said stationary plate, means to move said movable plate in an upward direction whereby the clamps secure the transfer plate to the stationary plate, and means permitting further elevation of said movable plate whereby the ejector pins elevate the units from the transfer plate.

3. An apparatus for removing unit objects carried in perforations of a transfer plate comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, a plurality of clamps positioned adjacent the edges of said stationary plate, means controlled by the upward movement of said movable plate to actuate said clamps to secure the transfer plate to the stationary plate, means to move said movable plate in an upward direction whereby the clamps are brought into clamping position, means permitting further elevation of said movable plate whereby the ejector pins elevate the units from the transfer plate, and means on said movable plate to position the means which remove the units from said ejector pins.

4. An apparatus for removing unit objects carried in perforations of a transfer plate comprising a stationary plate having perforations in alignment with the perforations of the transfer plate positioned thereon, a movable plate yieldingly positioned beneath and in spaced relation to said stationary plate, ejector pins carried by said movable plate, each ejector pin being in alignment with a perforation in said stationary plate, a clamp pivotally mounted adjacent each edge of the stationary plate, a screw having one end connected to said clamp and adapted to operate said clamp, a bracket carried by said stationary plate, said bracket being slidably mounted on said screw, means preventing sliding movement of said bracket on said screw during upward movement of said movable plate until the clamp has secured the transfer plate to the stationary plate, and means to move said movable plate in an upward direction whereby the clamps first secure the transfer plate to the stationary plate and thereafter the ejector pins elevate the units from the transfer plate.

5. An apparatus for removing unit objects carried in perforations of a transfer plate comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, a pivot shaft mounted adjacent an edge of the stationary plate, a plurality of clamping members secured to said shaft, a screw having one end connected to one of said clamps and adapted to operate said clamp whereby the other clamps on said shaft will be operated, a bracket carried by said stationary plate, said bracket being slidably mounted on said screw, means preventing sliding movement of said bracket on said screw during upward movement of said movable plate until the clamps have secured the transfer plate to the stationary plate, and means to move said movable plate in an upward direction whereby the clamps first secure the transfer plate to the stationary plate and thereafter the ejector pins elevate the units from the transfer plate.

6. An apparatus for removing unit objects carried in perforations of a transfer plate, comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, cam followers carried by said plate, a cooperating cam for each cam follower, spring means urging said plate downwardly to maintain each cam follower on its respective cam, a plurality of clamps positioned adjacent the edges of said stationary plate, means controlled by the movement of said movable plate to actuate said clamps to secure the transfer plate to said stationary plate, and means to actuate said cams to move said movable plate in an upward direction whereby the clamps secure the transfer plate to the stationary plate and the ejector pins elevate the units from the transfer plate.

7. An apparatus for removing unit objects carried in perforations of a transfer plate, comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, cam followers carried by said plate, a cooperating cam for each cam follower, spring means urging said plate downwardly to maintain each cam follower on its respective cam, a plurality of clamps positioned adjacent the edges of said stationary plate, means controlled by the upward movement of said movable plate to actuate said clamps to secure the transfer plate to said stationary plate, means to actuate said cams to move said movable plate in an upward direction whereby the clamps secure the transfer plate to the stationary plate, and means permitting further elevation of said movable plate whereby the ejector pins elevate the units from the transfer plate.

8. An apparatus for removing unit objects carried in perforations of a transfer plate, comprising a stationary plate having perforations in alignment with the perforations of the transfer plate positioned thereon, a movable plate positioned beneath and in spaced relation to said stationary plate, ejector pins carried by said movable plate, each ejector pin being in alignment with a perforation in said stationary plate, cam followers carried by said plate, a cam shaft, a cooperating cam for each cam follower mounted on said shaft, spring means urging said plate downwardly to maintain each cam follower on its respective cam, an operating shaft operatively connected to said cam shaft, a plurality of clamps positioned adjacent the edges of said stationary plate, means controlled by the upward movement of said movable plate to actuate said clamps to secure the transfer plate to said stationary plate, means to operate said operating shaft whereby said cams move said movable plate in an upward direction until the clamps secure the transfer plate to the stationary plate, means to lock said operating shaft when the clamps are in clamping position, and means permitting further elevation of said movable plate whereby the ejector pins elevate the units from the transfer plate upon further operation of said operating shaft, said further operation releasing said locking means.

9. An apparatus as set forth in claim 4 having locating pins carried by said movable plate, said locating pins being adapted to position and support a vacuum head having means to individually seize and hold each unit.

HARDEN F. TAYLOR.
VLADIMIR A. NEDZVEDSKY.